G. Russell & T. B. Hull.
Printers' Ink Roller.
Nº 60792.                    Patented Jan. 1, 1867

WITNESSES
E. Prescott

INVENTORS.
George Russell.

United States Patent Office.

GEORGE RUSSELL, OF NEW YORK, AND THOMAS B. HULL, OF BROOKLYN, NEW YORK.

Letters Patent No. 60,792, dated January 1, 1867.

IMPROVEMENT IN PRINTERS' INK ROLLERS.

The Schedule referred to in these Letters Patent and making part of the same.

TO ALL WHOM IT MAY CONCERN:

Be it known that we, GEORGE RUSSELL, of the city, county, and State of New York, and THOMAS HULL, of the city of Brooklyn, county of Kings, and State of New York, have invented a new and improved mode of making Printers' Ink Rollers; and we do hereby declare that the following is a full and exact description thereof, reference being had to the accompanying drawings, and to letters of reference marked thereon, and which are made a part of this specification.

Our invention consists in constructing the stock on which to form a printers' ink roller of a tube or rod, into the ends of which are placed journals on which it may turn, the said journals being screwed into the ends of the said rod or tube, or attached to it in any manner, so that they may be removed and replaced at pleasure; the primary object being to replace journals when worn out with new ones, thus avoiding the expense of new roller stocks when the journals become worn; also, that the same stocks may be used for presses requiring different sized journals, or that the journals may be removed when, for any reason, it is desirable to remove them.

Figure 1, on the accompanying drawing, represents the stock and journals complete.

Figure 3:
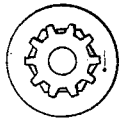
Figure 3 represents the same constructed for use without the screw.
Figure 2:
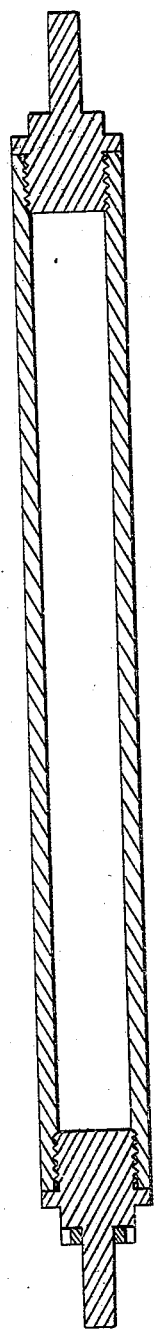
Figure 2 represents the journal made with a screw to fit into the end of the rod or tube.
Figure 1:
Figure 5:
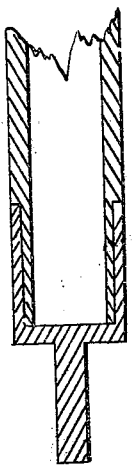
Figure 5 represents a rod and journal, showing how it may be affixed without the screw.
Figure 4:
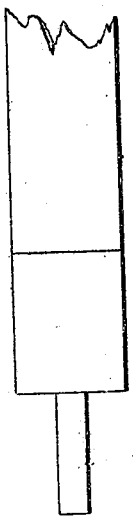
Figure 4 represents a rod with the journal.

What we claim as our invention, and desire to secure by Letters Patent, is—

1. The construction of a stock on which to cast or form printers' rollers, for receiving or distributing ink, in such a manner that the journals on which it turns may be removed and replaced at pleasure.

2. We claim the use of a cylinder or tube as a stock for a printers' roller.

GEORGE RUSSELL,
THOMAS B. HULL.

Witnesses:
   C. SWARTCOTT,
   TAL. P. SHAFFNER.